United States Patent
Keller et al.

(10) Patent No.: US 11,765,308 B2
(45) Date of Patent: Sep. 19, 2023

(54) VISUALIZATION DEVICE AND METHOD FOR VISUALIZING THE INTERIOR OR EXTERIOR OF A VEHICLE

(71) Applicant: SIEMENS MOBILITY GMBH, Munich (DE)

(72) Inventors: Bernd Keller, Glienicke (DE); Andreas Pradel, Berlin (DE); Henrik Regen, Berlin (DE)

(73) Assignee: Siemens Mobility GmbH, Munich (DE)

( * ) Notice: Subject to any disclaimer, the term of this patent is extended or adjusted under 35 U.S.C. 154(b) by 286 days.

(21) Appl. No.: 17/270,129

(22) PCT Filed: Aug. 5, 2019

(86) PCT No.: PCT/EP2019/070997
§ 371 (c)(1),
(2) Date: Feb. 22, 2021

(87) PCT Pub. No.: WO2020/038706
PCT Pub. Date: Feb. 27, 2020

(65) Prior Publication Data
US 2021/0185239 A1     Jun. 17, 2021

(30) Foreign Application Priority Data
Aug. 22, 2018   (DE) ............... 10 2018 214 210.6

(51) Int. Cl.
H04N 5/265         (2006.01)
H04L 67/125        (2022.01)
(Continued)

(52) U.S. Cl.
CPC ............ *H04N 5/265* (2013.01); *B61L 27/57* (2022.01); *G06T 11/001* (2013.01);
(Continued)

(58) Field of Classification Search
CPC ...... H04N 5/265; H04N 5/2257; H04N 23/57; H04L 67/125; G06K 9/00671;
(Continued)

(56) References Cited

U.S. PATENT DOCUMENTS

| 7,054,793 B2 | 5/2006 | Moritz et al. |
| 7,216,035 B2* | 5/2007 | Hortner ............... G01C 21/365 |
| | | 701/28 |

(Continued)

FOREIGN PATENT DOCUMENTS

| DE | 19832974 A1 | 1/2000 |
| EP | 1403790 A2 | 3/2004 |

OTHER PUBLICATIONS

Regenbrecht Holger et al: "Augmented reality projects in the automotive and aerospace industries", IEEE Computer Graphics and Applications, IEEE Service Center, New York, NY, US, vol. 25, No. 6, pp. 48-56, XP008118235; ISSN: 0272-1716, DOI: 10.1109/MCG.2005.124; found on Nov. 7, 2005; The whole document; 2005.

*Primary Examiner* — Wesner Sajous
(74) *Attorney, Agent, or Firm* — Laurence A. Greenberg; Werner H. Stemer; Ralph E. Locher

(57) ABSTRACT

A visualization device includes a camera for continuously detecting the surroundings and, when the camera is oriented towards the interior or the exterior shell of a real vehicle, generating a real vehicle image which can change depending on the camera orientation. A data storage unit stores at least one component data set. The data set contains data, on the basis of which the visual representation of at least one vehicle component is possible. A computing device is programmed to integrate the representation of the vehicle component into the real vehicle image while taking into consideration the scale and perspective and to generate a virtual vehicle image that represents the real vehicle together with the virtually installed vehicle component. A display device displays the virtual vehicle image. A method for visualizing the interior or exterior of a vehicle is also provided.

17 Claims, 6 Drawing Sheets

(51) Int. Cl.
*G06T 1/00* (2006.01)
*G07C 5/08* (2006.01)
*B61L 27/57* (2022.01)
*G06V 20/20* (2022.01)
*G06T 11/00* (2006.01)
*H04N 23/57* (2023.01)

(52) U.S. Cl.
CPC .......... *G07C 5/0808* (2013.01); *H04L 67/125* (2013.01); *H04N 23/57* (2023.01)

(58) Field of Classification Search
CPC ....... G07C 5/0808; G06V 20/20; B61L 27/57; B61L 27/0094; G06T 11/001; G06T 19/006; G06T 7/33; G06T 2207/30208; G06T 17/00
See application file for complete search history.

(56) References Cited

U.S. PATENT DOCUMENTS

| | | | |
|---|---|---|---|
| 2001/0025229 A1* | 9/2001 | Moritz | G06T 17/00 |
| | | | 703/1 |
| 2006/0155467 A1* | 7/2006 | Hortner | G01C 21/365 |
| | | | 701/431 |
| 2017/0053047 A1* | 2/2017 | McDaniel | G06F 30/17 |

* cited by examiner

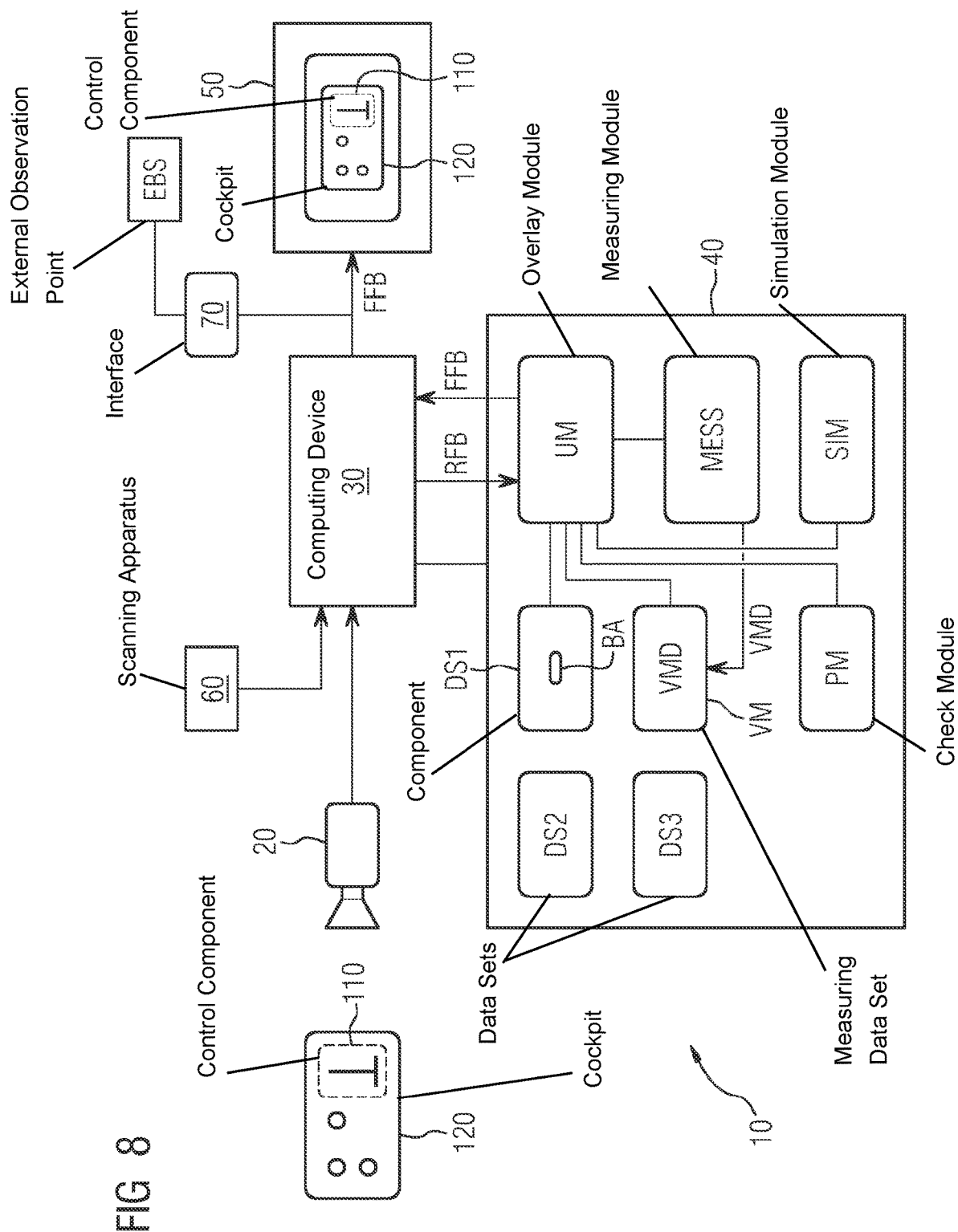

VISUALIZATION DEVICE AND METHOD FOR VISUALIZING THE INTERIOR OR EXTERIOR OF A VEHICLE

BACKGROUND OF THE INVENTION

Field of the Invention

The invention relates to visualization devices and methods for visualizing the interior or exterior of a vehicle.

Many rail vehicles currently in operation are still not compatible with the European Train Control System (ETCS). The task for many operators is therefore to retrofit existing vehicles and render them ETCS-compatible; this generally requires the subsequent integration of ETCS system components on the vehicle side. The components to be retrofitted can be, for instance, radar sensors, balise antennae to be arranged below the vehicle for reading out track balises, roof antennae, component cabinets or component part carriers which have to be mounted inside or outside of the vehicle.

For vehicles which already physically exist, it is generally necessary to define, evaluate and implement a vehicle-specific integration solution for the system components in each case. For this purpose, the existing vehicles are usually inspected on site by equipment companies and the integration concepts are defined on the real object.

SUMMARY OF THE INVENTION

The invention starts at this point and has the task of specifying a particularly suitable method for visualizing the interior or exterior of a vehicle and a correspondingly suitable visualization device, particularly in view of the retrofitting problem described.

This object is achieved with respect to the visualization device in accordance with the invention by the features described below. Advantageous embodiments of the inventive visualization device are specified in the subclaims.

Provision is then made in accordance with the invention for the visualization device to comprise: a camera for continuously recording the surroundings and, when the camera is oriented towards an interior or the exterior shell of a real vehicle, for generating a real vehicle image which can change depending on the camera orientation, a data storage unit in which at least one component data set is stored, said data set containing data, on the basis of which the visual representation of at least one vehicle component is possible, a computing device which is programmed to integrate the representation of the vehicle component into the real vehicle image while taking into consideration the scale and perspective and to generate a virtual vehicle image that represents the real vehicle together with the virtually installed or attached vehicle component and a display device for displaying the virtual vehicle image.

One significant advantage of the inventive visualization device is that this makes the plan to retrofit a vehicle with a vehicle component possible in a particularly simple manner. By means of the inventively provided formation of a virtual vehicle image, which shows a real vehicle with a virtually added or installed vehicle component, a retrofitting can be planned on site in a particularly efficient manner.

In an advantageous embodiment, the display device can be integrated in glasses or formed by means of glasses which are transparent or semitransparent and show the real vehicle or the real vehicle image through the transmission of light which is reflected, scattered or generated by the vehicle itself. In this case, the virtual vehicle image is formed by the display device by superimposing the virtually installed or attached vehicle component(s) or overlaying the same with the light of the real vehicle.

Alternatively, the display device can be integrated in glasses or formed by glasses, which are nontransparent and do not transmit light from the outside; in this case the vehicle image calculated by the computing device is shown by the display device.

It is advantageous if the display device shows the virtual vehicle image in real time, irrespective of delays for technical reasons in the calculation of the virtual vehicle image and relating to the camera-side generation of the real vehicle image.

The visualization device preferably has, in addition, a measuring device, which enables a spatial measurement of the vehicle and the creation of a measuring data set.

The component data set preferably contains dimensions of the vehicle component.

The computing device is preferably programmed to generate the virtual vehicle image by taking into consideration the measuring data set and the dimensions of the vehicle component, namely (at least also) with respect to an installation or attachment point (if such exists) which is predetermined on the user- or computer-side.

Furthermore, it is advantageous if the component data set additionally contains at least one installation or attachment condition to be fulfilled and if the computing device is programmed to check, in particular using the measuring data set, whether the installation or attachment condition is fulfilled for an installation or attachment point which is predetermined on the user side and/or the installation or attachment of the vehicle component at an installation or attachment point, which is predetermined on the user side, is possible.

It is also advantageous if the computing device is programmed to show in the virtual vehicle image, in particular by means of coloring, whether the installation or attachment of the vehicle component at an installation or attachment point, which is predetermined on a user side, is possible.

Alternatively or in addition, provision can advantageously be made for the computing device to be programmed to check, on the basis of the measuring data set and the dimensions of the vehicle component, the installation or attachment points in or on the vehicle at which an installation or attachment of the vehicle component would be possible, and to show the possible installation or attachment points in the virtual vehicle image.

The camera and the display device are preferably integrated in augmented reality glasses.

The invention relates furthermore to a method for visualizing the interior or exterior of a vehicle. Provision is made in accordance with the invention for an interior or an exterior shell of a real vehicle to be recorded continuously in time with a camera by forming a real vehicle image, for data to be read out from a component data set stored in a data storage unit, for the visual display of at least one vehicle component to be possible on its basis, for the representation of the vehicle component to be integrated into the real vehicle image while taking into consideration the scale and perspective and for a virtual vehicle image to be generated, which represents the real vehicle with the virtually installed or attached vehicle component and for the virtual vehicle image to be shown.

With regard to the advantages of the inventive method, reference should be made to the above embodiments in conjunction with the inventive visualization device.

The virtual vehicle image is preferably shown in real time, disregarding delays for technical reasons in the calculation of the virtual vehicle image and with respect to the recording of the real vehicle image.

With an embodiment variant of the method which is considered to be particularly advantageous, provision is made for the vehicle to be measured spatially outside and/or inside and for a measuring data set to be created, from which component data set dimensions of the vehicle component are read out and on the basis of the measuring data set and the dimensions of the vehicle component a check is carried out to determine whether the installation or attachment of the vehicle component at an installation or attachment point, which is predetermined on the user side, is possible.

The component data set preferably contains in addition at least one installation or attachment condition to be fulfilled, and a check is preferably carried out to determine whether the installation or attachment condition is fulfilled for the installation or attachment point which is predetermined on the user side.

It is particularly advantageous if the vehicle component is a control component, in particular a control component in the driver's cab of the vehicle, and a check is carried out on the basis of the virtual vehicle image to determine whether control of the control component installed virtually in the vehicle is possible and/or one or more predetermined ergonomic minimum criteria is/are fulfilled.

The virtual vehicle image can advantageously be transmitted to a remote observation point, in particular by way of the Internet, and observed at the remote observation point.

Alternatively or in addition, provision can be made for the real vehicle image to be transmitted to a remote observation point, in particular by way of the Internet, and for the virtual vehicle image to be generated at the remote observation point and then observed.

The invention is then explained in more detail on the basis of exemplary embodiments.

BRIEF DESCRIPTION OF THE SEVERAL VIEWS OF THE DRAWING

FIG. 8 shows an exemplary embodiment of an inventive visualization device, in which additionally a simulation module or a simulation device is present.

DETAILED DESCRIPTION OF THE INVENTION

Figure 1:
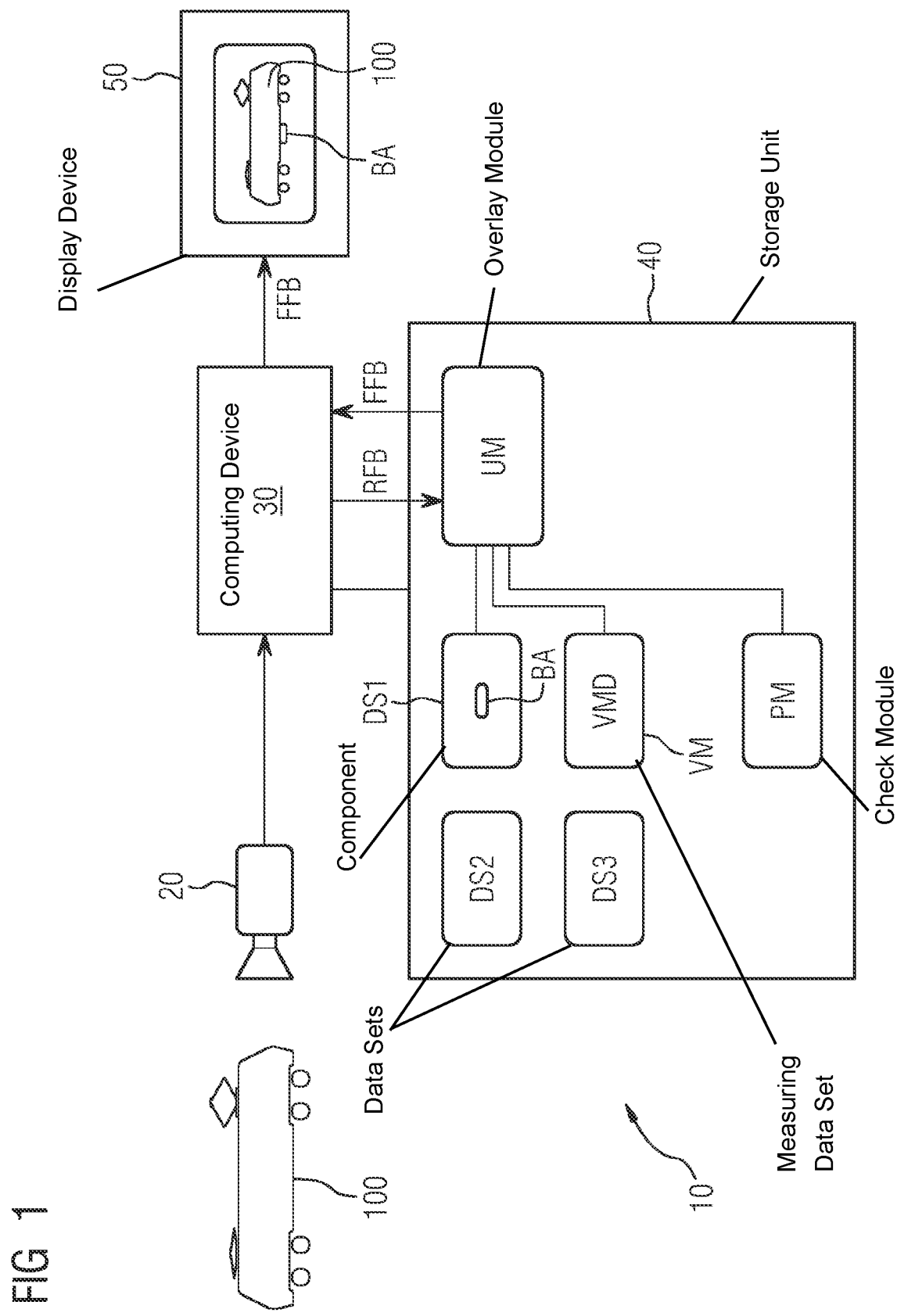
FIG. 1 shows an exemplary embodiment of an inventive visualization device, on the basis of which an exemplary embodiment for the inventive method is explained.

For the sake of clarity, in the figures, the same reference characters are always used for identical or comparable components.

FIG. 1 shows a visualization device 10, which has a camera 20, a computing device 30, a storage unit 40 and a display device 50.

A plurality of component data sets DS1 to DS3 is stored in the storage unit 40 which describe in each case a vehicle component which is suitable for subsequent installation in or on a vehicle, namely preferably at least in respect of the mechanical dimensions of the respective vehicle component and with respect to the installation and/or attachment conditions possibly to be retained.

One of the component data sets, for instance the component data set DS1, describes an ETCS-compatible balise antenna BA, which is suited for subsequent assembly on a rail vehicle.

An overlay software module, referred to below in brief as overlay module UM, is moreover stored in the storage unit 40. The overlay module UM is used, in the embodiment by the computing device 20, to overlay a real image with virtual representations of one or more vehicle components, which are defined in the data sets DS1 to DS3.

A measuring data set VM stored in the storage unit 40 contains measuring data VMD which is based on a spatial measurement of vehicles and relates to the real rail vehicle 100 shown to the left in FIG. 1. The measuring data set VM and the measuring data VMD contained therein enable a particularly accurate representation of virtual vehicle components in or on the real vehicle 100 for the overlay module UM.

The visualization device 10 according to FIG. 1 is operated by way of example as follows for the purpose of retrofitting a vehicle with vehicle components:

The camera 20 records a real vehicle image RFB, which maps the rail vehicle 100 shown to the left in FIG. 1, for instance, and transmits this to the computing device 30.

In the embodiment of the overlay module UM, the computing device 30 will overlay the real vehicle image RFB with a representation of at least one vehicle component which is selected on the user side for subsequent assembly, said vehicle component being described by one of the data sets DS1 to DS3, by taking into consideration the scale and perspective. A virtual vehicle image FFB, which shows the real rail vehicle 100 with the vehicle component or components attached thereto, is produced as a result of the overlay. The virtual vehicle image FFB is shown by the display device 50 of the visualization device 10.

In the exemplary embodiment according to FIG. 1, it is assumed, by way of example, that the balise antenna BA has been selected on the user side as a vehicle component to be retrofitted; accordingly the virtual vehicle image FFB shows the rail vehicle 100 with the balise antenna BA attached at the desired assembly position on the user side.

For the purpose of overlaying the real vehicle image RFB with the mapping of the balise antenna BA, the overlay module UM reads out the corresponding component data set DS1 and evaluates the data contained therein, in particular the dimensions and a suitable balise mapping. Moreover, the overlay module UM accesses the measuring data set VM, in which the measuring data VMD of the real rail vehicle 100 is stored.

By taking into consideration the dimensions and the balise mapping of the balise antenna BA and the measuring data VMD of the rail vehicle 100, the overlay module UM can now form the virtual vehicle image FFB and show the rail vehicle 100 equipped with the balise antenna BA on the display device 50.

The overlay of the real vehicle image RFB with the representation of the balise antenna BA is preferably carried out in real time, so that during an observation of the real rail vehicle 100 and also during a movement of the camera 20 or a pivoting of the camera 20 the balise antenna BA attached virtually thereto can also be shown at the same time.

A check module PM which is preferably likewise contained in the storage unit 40 can carry out a check in parallel, to determine whether the assembly position of the balise antenna BA, selected by the operator of the visualization device 10, on the real rail vehicle 100 fulfills the installation and/or attachment conditions contained in the component data set DS1 and an installation or attachment of the balise antenna BA is possible.

If an installation/attachment of the balise antenna BA on the real rail vehicle 100 at the desired position on the operator side is not possible or at least not optimal, the corresponding check result is preferably transmitted to the overlay module UM, which marks the negative check result determined in the virtual vehicle image FFB when the balise antenna BA is represented, for instance by means of a corresponding coloring.

With respect to a high operator friendliness of the visualization device 10, it is considered to be advantageous if the check module PM not only carries out an inspection of the installation and attachment capabilities of a selected vehicle component with respect to an assembly location selected on the user side, but moreover also itself determines the neighboring area of the selected assembly location in which assembly would still be possible. For assembly, correspondingly suitable locations can be marked in another color as assembly locations which are unsuitable or not permitted, for instance.

The check module PM, independent of assembly locations suggested on the user side, can also automatically determine suggestions for suitable assembly locations and show these in the virtual vehicle image FFB.

In the case of a subsequent assembly of a balise antenna BA, the installation and/or attachment conditions stored in the component data set DS1 take into consideration, for instance, that balise antennae for receiving and sending electromagnetic radiation have to have spatial clearances, which allow for transmit and receive operation. Furthermore, the installation and attachment conditions can take into consideration that balise antennae BA have to retain predetermined minimum distances from the components containing iron, so that the last one does not interfere with the transmitting and receiving of electromagnetic radiation.

Figure 2:
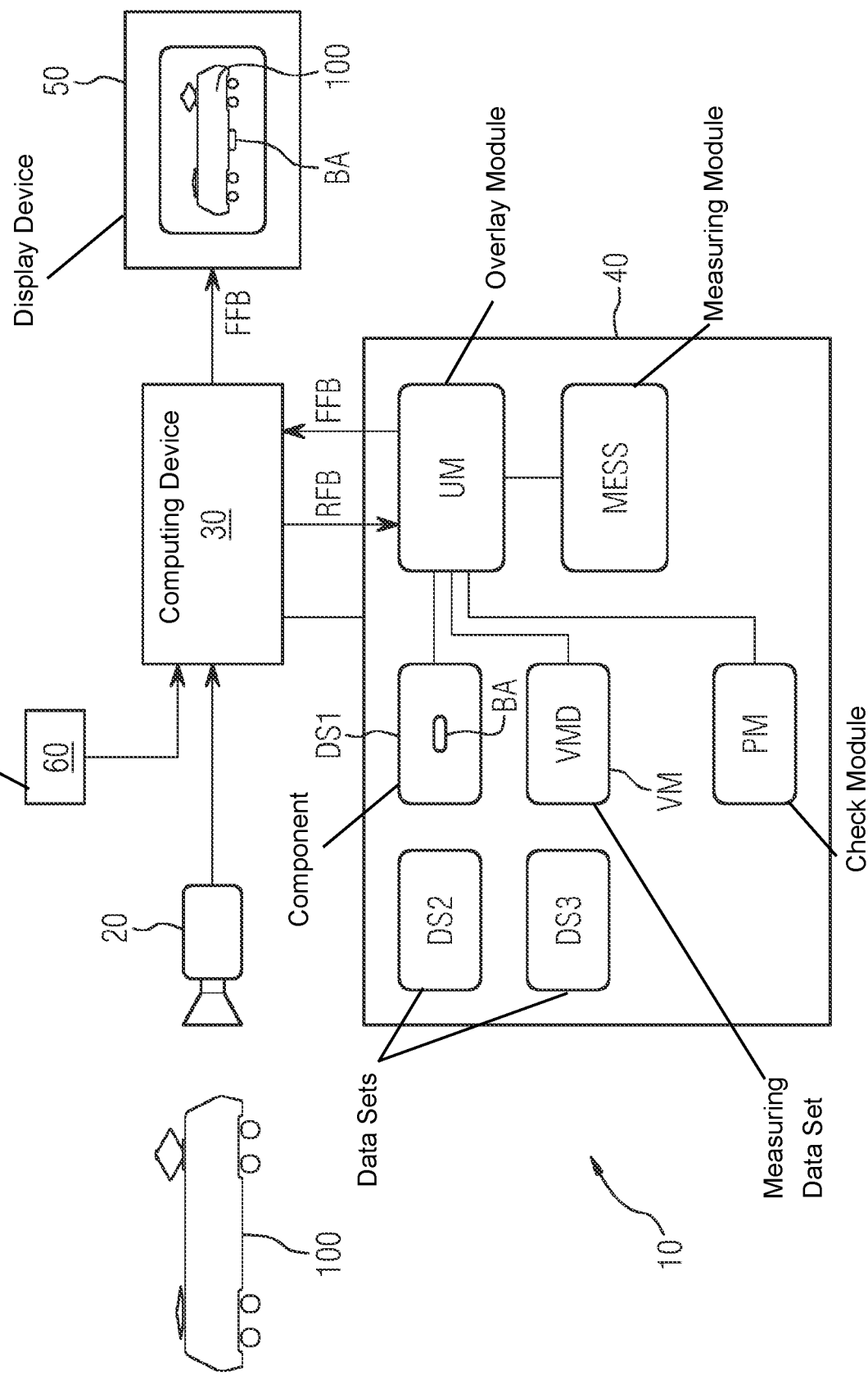
FIG. 2 shows an exemplary embodiment of an inventive visualization device, in which a measuring device is additionally present.

FIG. 2 shows an exemplary embodiment for a visualization device 10, in which, in addition, a measuring software module, subsequently abbreviated below to the measuring module MESS, is present. When the measuring module MESS is executed by the computing device 30, the computing device 30 operates together with a scanning apparatus 60 of the visualization device 10 and carries out a three-dimensional spatial measurement of the real rail vehicle 100, be it from the outside in order to record the outer shell of the real rail vehicle 100 or from the inside in order to record the interior space/s of the real rail vehicle 100. The measuring data VMD recorded by the measuring module MESS is stored in the measuring data set VM, so that the overlay module UM can similarly access this measuring data, as has been explained above in conjunction with FIG. 1.

Figure 3:
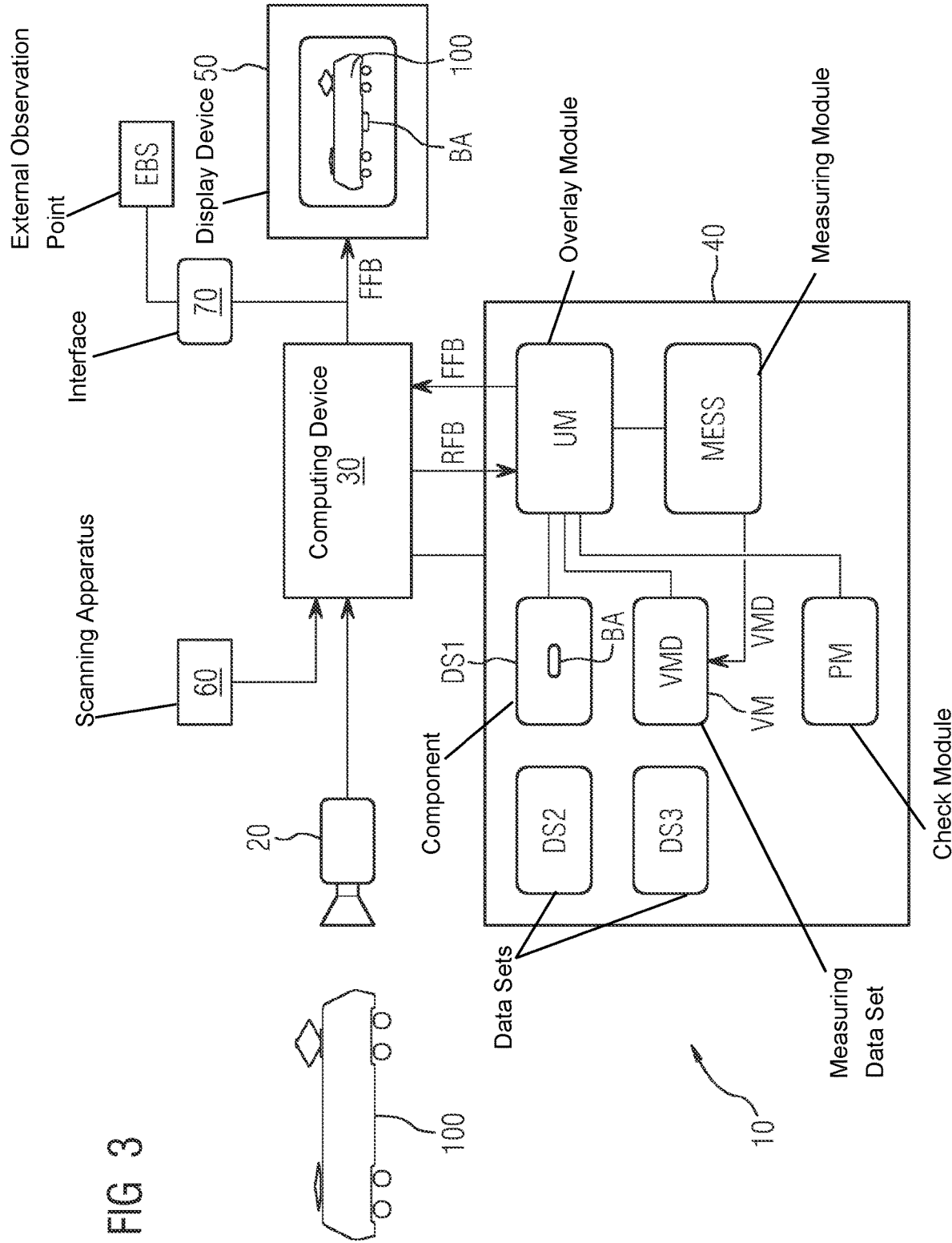
FIG. 3 shows an exemplary embodiment of an inventive visualization device, which additionally has an interface for connecting the visualization device to an external data network, in particular the Internet.

FIG. 3 shows an exemplary embodiment for a visualization device 10, which, in terms of structure, corresponds to the visualization device 10 according to FIG. 2 and furthermore is still equipped with an interface 70. The interface 70 enables a transmission of the virtual vehicle image FFB, generated by the computing device 30 when the overlay module UM is embodied, to an external observation point EBS. A display of the virtual vehicle image FFB is therefore not only possible on the display device 50 of the visualization device 10, but instead moreover also at the external observation point EBS.

The embodiment according to FIG. 3 is advantageous in that when a real rail vehicle is observed on site and a virtual subsequent equipping of the real rail vehicle with a vehicle component is observed, the virtual result of this equipping cannot only be shown locally on the display device 50 of the visualization device 10, but instead also at another point, for instance at a planning or configuration center which is far away.

Figure 4:
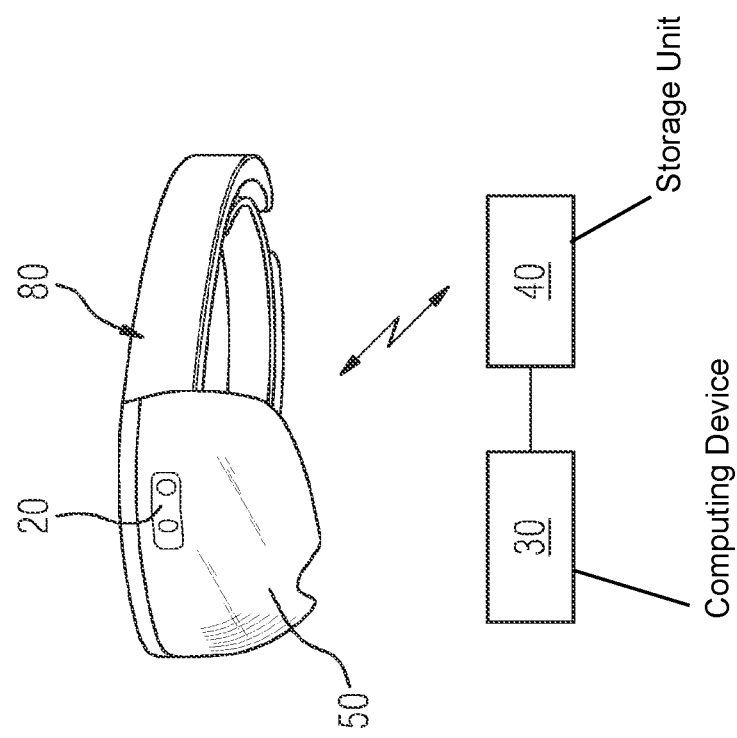
FIG. 4 shows an exemplary embodiment of an inventive visualization device, in which a camera and a display device are integrated in augmented reality glasses.

FIG. 4 shows an exemplary embodiment of a visualization device 10, in which the camera 20 and the display device 50 are integrated in augmented reality glasses, referred to below as AR glasses 80, and are connected to the computing device 30 and the storage unit 40 by way of radio or wirelessly. An operator wearing the AR glasses 80 according to FIG. 4 can therefore observe real vehicles and equip these virtually with vehicle components, which are stored in the storage unit 40 in the form of component data sets DS1-DS3, and the resulting virtually retrofitted vehicle can be displayed in real time on the AR glasses 80.

Figure 5:
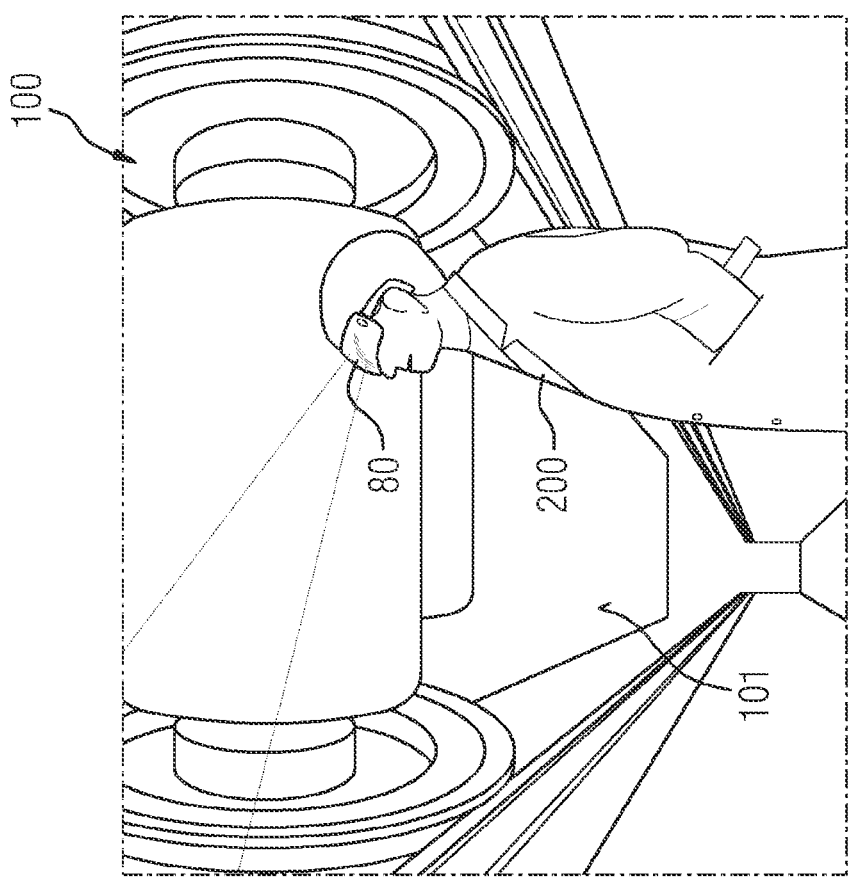
FIG. 5 shows by way of example an operator, who wears the augmented reality glasses according to FIG. 4 and an underside of a rail vehicle for the purpose of subsequently installing a balise antenna.

In a schematic representation, FIG. 5 shows an operator 200 who wears the AR glasses 80 according to FIG. 4 and examines the lower side 101 of the real rail vehicle 100.

Figure 6:
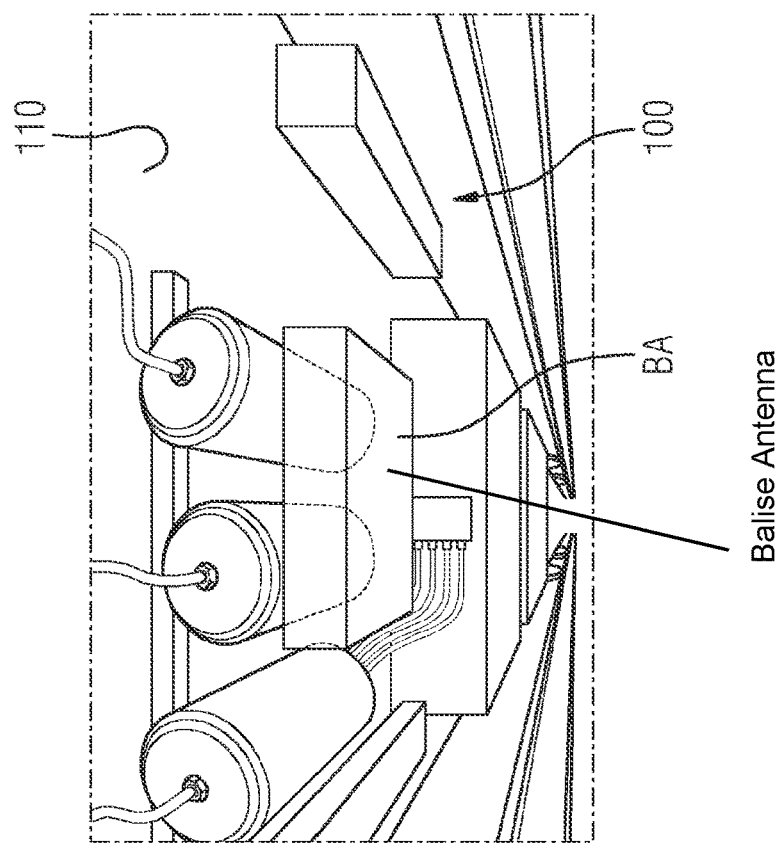
FIG. 6 shows an exemplary embodiment for a virtual vehicle image, which shows a real rail vehicle with a virtually attached balise antenna at a suitable assembly position.

FIG. 6 shows the underside of the rail vehicle 100 according to FIG. 5 in accordance with a virtual retrofitting of the vehicle floor with a balise antenna BA, as has been explained above in conjunction with the exemplary embodiments according to FIGS. 1 to 3. Here FIG. 6 shows a suitable assembly position for the balise antenna BA, in which the installation and attachment conditions for the balise antenna BA, as defined in the component data set DS1 of the storage unit 40, are fulfilled.

Figure 7:
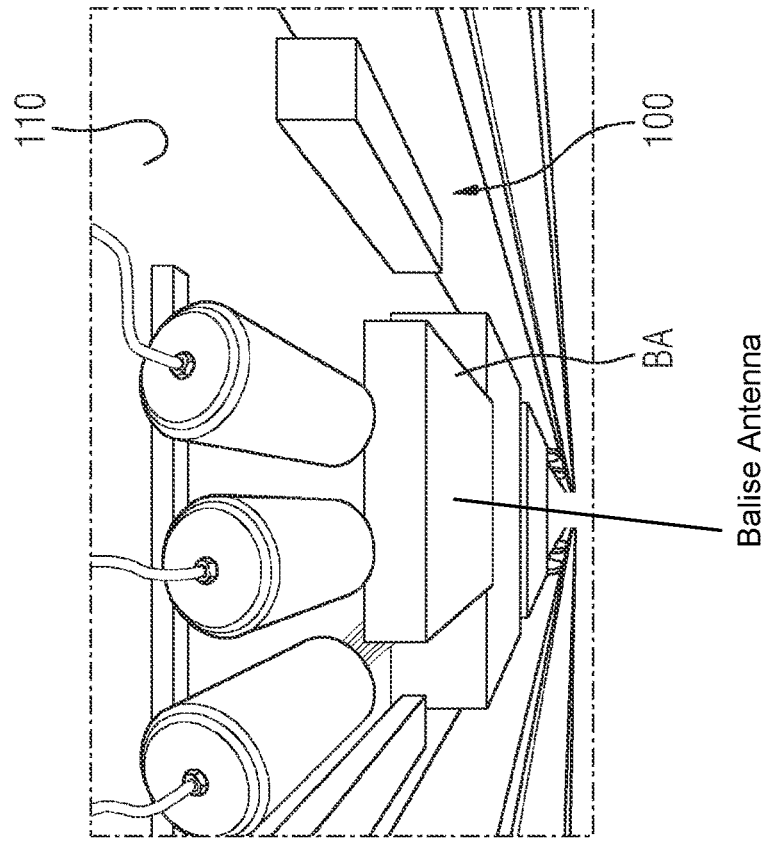
FIG. 7 shows an exemplary embodiment for a virtual vehicle image, which shows a real rail vehicle with a virtually attached balise antenna at an unsuitable assembly position.

FIG. 7 shows an assembly of the balise antenna BA at an unsuitable point. The lack of suitability of the assembly point for the installation or attachment of the balise antenna BA is marked in the virtual vehicle image FFB by means of a corresponding coloring, for instance.

If a vehicle component to be retrofitted is a control component 110, in the driver's cab or cockpit 120 of the vehicle, for instance, it is therefore advantageous if a simulation module SIM is present in the storage unit 40, which, in the virtual vehicle image FFB, enables a virtual control of the control component 110 to be added virtually. In other words, in the case of such an embodiment, the control of the vehicle with the control component 110 can be checked, although this is not yet actually present in the vehicle. Such an embodiment of the visualization device 10 with a simulation module SIM is shown by way of example in FIG. 8.

The exemplary embodiments described above in conjunction with the figures are based on a use of the augmented reality technology in a real vehicle environment and enable, for instance, the definition of vehicle-specific system integration concepts live directly on or in the rail vehicle during a vehicle inspection.

The merging of both realities is carried out by the effect of overlaying the real and virtual surroundings. The components in the real rail vehicle can be arranged live to scale and perspectively, the position can be evaluated and documented. The positioning of the components in the vehicle surroundings preferably takes place with the aid of stored boundary conditions of the system components (such as e.g. mechanical installation conditions, necessary distances, operating areas and clearances etc.). The virtual installation of the components is preferably restrictively only possible within the permissible framework of these criteria.

The analysis of the operating areas and clearances is preferably carried out promptly on the basis of collision analyses of the scanned surroundings (the image of the virtual environment) with respect to the newly extended installation components. The results of these are disposed live directly in the computing device or the "augmented reality system". Penetrations and collisions of the extended components with respect to available systems and the available surroundings can be shown and a direct adjustment of the installation position can thus be forced (e.g. analysis of the radar beam cone relating to the available vehicle surroundings in the case of a balise antenna installation).

The merging of the real and virtual surroundings for analyzing the installation situation can also be used in interaction with the human body, for instance an analysis of the driver's cab with respect to ergonomics can be carried out.

In order to display the impression of the new installation situation particularly realistically, the removal of available components (surfaces and bodies) in the virtually scanned region can be enabled, in order thus to illustrate the future installation situation.

Recordings (photos, videos, 3D models etc.) of the determined installation situations can also be generated.

The augmented technology is preferably embedded in a sequence program, which is run through in a structured manner for each installation of a vehicle component. The basis of this sequence of the individual steps can be a stored decision tree. It can therefore be ensured that all individual necessary aspects and criteria are taken into consideration in association with the installation of the vehicle components.

The virtual results and solutions are preferably documented and can thus be used directly as a result report. This documentation or the result report can be extended directly on the object by means of remarks, notations, comments etc.

The control of menus for inputting and actuating the visualization device or for controlling the retrofitting method is preferably carried out via speech or gestures.

Although the invention has been illustrated and described in detail based on preferred exemplary embodiments, the invention is not restricted by the examples given and other variations can be derived therefrom by a person skilled in the art without departing from the protective scope of the invention. In particular, the method described by way of example above and the visualization device described by way of example for retrofitting can also be used in vehicles other than rail vehicles, in other words for instance in all types of land, water or air vehicles.

LIST OF REFERENCE SIGNS

10 Visualization device
20 Camera
30 Computing device
40 Storage unit
50 Display device
60 Scanning apparatus
70 Interface
80 Augment reality glasses
100 Rail vehicle
101 Lower side
110 Control component
120 Cockpit
200 Control person
BA Balise antenna
DS1 Data set
DS2 Data set
DS3 Data set
EBS External observation point
FFB Virtual vehicle image
MESS Measuring module
PM Check module
RFB Real vehicle image
SIM Simulation module
UM Overlay module
VM Measuring data set
VMD Measuring data

The invention claimed is:

1. A visualization device, comprising:
a camera for continuously recording surroundings of an interior or an exterior shell of a real vehicle, said camera, upon being oriented towards the interior of the real vehicle or being oriented towards the exterior shell of the real vehicle, being configured to generate a real vehicle image able to change depending on a camera orientation;
a measuring device enabling a spatial measurement of the vehicle and a creation of a measuring data set including at least one component data set of at least one vehicle component;
a data storage unit storing the at least one component data set;
the at least one component data set containing data, permitting a visual representation of the at least one vehicle component to be based on the data;
a computing device programmed to integrate said visual representation of the at least one vehicle component into the real vehicle image while taking scale and perspective of the at least one vehicle component into consideration and to generate a virtual vehicle image representing the real vehicle with a virtually installed or attached vehicle component;
and
a display device for displaying the virtual vehicle image.

2. The visualization device according to claim 1, wherein said display device shows the virtual vehicle image in real time, irrespective of delays for technical reasons in a calculation of the virtual vehicle image and in relation to a camera-side generation of the real vehicle image.

3. A visualization device, comprising:
a camera for continuously recording surroundings of an interior or an exterior shell of a real vehicle, said camera, upon being oriented towards the interior of the real vehicle or being oriented towards the exterior shell of the real vehicle, being configured to generate a real vehicle image able to change depending on a camera orientation;
a data storage unit storing at least one component data set containing data, permitting a visual representation of at least one vehicle component to be based on the data, said at least one component data set containing dimensions of the at least one vehicle component;

a computing device programmed to integrate said visual representation of the at least one vehicle component into the real vehicle image while taking scale and perspective of the at least one vehicle component into consideration and to generate a virtual vehicle image representing the real vehicle with a virtually installed or attached vehicle component; and a display device for displaying the virtual vehicle image.

4. The visualization device according to claim 3, wherein said computing device is programmed to generate the virtual vehicle image by taking into consideration a measuring data set and dimensions of the at least one vehicle component with respect to an installation or attachment point being predetermined by a user or by said computing device.

5. A visualization device, comprising:
a camera for continuously recording surroundings of an interior or an exterior shell of a real vehicle, said camera, upon being oriented towards the interior of the real vehicle or being oriented towards the exterior shell of the real vehicle, being configured to generate a real vehicle image able to change depending on a camera orientation;

a data storage unit storing at least one component data set containing data, permitting a visual representation of at least one vehicle component to be based on the data, said at least one component data set additionally containing at least one installation or attachment condition to be fulfilled;

a computing device programmed to integrate said visual representation of the at least one vehicle component into the real vehicle image while taking scale and perspective of the at least one vehicle component into consideration and to generate a virtual vehicle image representing the real vehicle with a virtually installed or attached vehicle component;

said computing device programmed to check at least one of:
whether the installation or attachment condition is fulfilled for an installation or attachment point predetermined on a user side, or
whether the installation or attachment of the at least one vehicle component is possible at an installation or attachment point predetermined on the user side; and a display device for displaying the virtual vehicle image.

6. The visualization device according to claim 5, wherein said computing device is programmed to check by using the measuring data set.

7. A visualization device, comprising:
a camera for continuously recording surroundings of an interior or an exterior shell of a real vehicle, said camera, upon being oriented towards the interior of the real vehicle or being oriented towards the exterior shell of the real vehicle, being configured to generate a real vehicle image able to change depending on a camera orientation;

a data storage unit storing at least one component data set containing data, permitting a visual representation of at least one vehicle component to be based on the data;

a computing device programmed to integrate said visual representation of the at least one vehicle component into the real vehicle image while taking scale and perspective of the at least one vehicle component into consideration and to generate a virtual vehicle image representing the real vehicle with a virtually installed or attached vehicle component;

said computing device programmed to at least one of:
show in the virtual vehicle image whether the installation or attachment of the at least one vehicle component is possible at an installation or attachment point predetermined on a user side, or
check, on a basis of the measuring data set and dimensions of the at least one vehicle component, installation or attachment points in or on the vehicle at which an installation or attachment of the at least one vehicle component would be possible, and to show possible installation or attachment points in the virtual vehicle image; and a display device for displaying the virtual vehicle image.

8. The visualization device according to claim 7, wherein said computing device is programmed to show in the virtual vehicle image whether the installation or attachment of the at least one vehicle component is possible at an installation or attachment point predetermined on a user side, by coloring.

9. The visualization device according to claim 1, wherein said camera and said display device are integrated in augmented reality glasses.

10. A method for visualizing an interior or exterior of a vehicle, the method comprising:
using a camera to continuously record an interior or an exterior shell of a real vehicle to form an image of the real vehicle;

reading out data from a component data set stored in a data storage unit, to permit a visual representation of at least one vehicle component based on the data;

integrating the visual representation of the at least one vehicle component into the real vehicle image by taking scale and perspective of the at least one vehicle component into consideration and generating a virtual vehicle image representing the real vehicle with a virtual installed or attached vehicle component;

spatially measuring the vehicle at least one of outside or inside and creating a measuring data set;

reading out dimensions of the at least one vehicle component from the component data set; and carrying out a check based on the measuring data set and the dimensions of the at least one vehicle component to determine whether an installation or attachment of the at least one vehicle component at an installation and attachment point predetermined on a user side is possible; and showing the virtual vehicle image.

11. The method according to claim 10, which further comprises showing the virtual vehicle image in real time, irrespective of delays for technical reasons in a calculation of the virtual vehicle image and in relation to the recording of the real vehicle image.

12. A method for visualizing an interior or exterior of a vehicle, the method comprising:
using a camera to continuously record an interior or an exterior shell of a real vehicle to form an image of the real vehicle;

reading out data from a component data set stored in a data storage unit, to permit a visual representation of at least one vehicle component based on the data;

integrating the visual representation of the at least one vehicle component into the real vehicle image by taking scale and perspective of the at least one vehicle component into consideration and generating a virtual vehicle image representing the real vehicle with a virtual installed or attached vehicle component;

providing the component data set with at least one installation or attachment condition to be fulfilled; and carrying out a check to determine whether the installation or attachment condition is fulfilled for an installation or attachment point predetermined on a user side; and showing the virtual vehicle image.

13. A method for visualizing an interior or exterior of a vehicle, the method comprising:

using a camera to continuously record an interior or an exterior shell of a real vehicle to form an image of the real vehicle;

reading out data from a component data set stored in a data storage unit, to permit a visual representation of at least one vehicle component based on the data;

integrating the visual representation of the at least one vehicle component into the real vehicle image by taking scale and perspective of the at least one vehicle component into consideration and generating a virtual vehicle image representing the real vehicle with a virtual installed or attached vehicle component;

providing the at least one vehicle component as a control component disposed in or out of a vehicle cab of the vehicle;

carrying out a check based on the virtual vehicle image to determine at least one of:

a possibility of a control of the control component being installed virtually in the vehicle, or a fulfillment of one or more predetermined ergonomic minimum criterion or criteria; and showing the virtual vehicle image.

14. The method according to claim 10, which further comprises transmitting the virtual vehicle image to a remote observation point, and observing the virtual vehicle image at the remote observation point.

15. The method according to claim 14, which further comprises carrying out the transmission of the virtual vehicle image by way of the Internet.

16. The method according to claim 10, which further comprises:

transmitting the real vehicle image to a remote observation point; and generating the virtual vehicle image at the remote observation point and then observing the virtual vehicle image.

17. The method according to claim 16, which further comprises carrying out the transmission of the virtual vehicle image by way of the Internet.

* * * * *